UNITED STATES PATENT OFFICE.

TEÓFANES CARRASCO, OF ATZCAPOTZALCO, MEXICO.

PRESERVATIVE FOR FRUITS, EGGS, AND THE LIKE.

1,246,392.   Specification of Letters Patent.   Patented Nov. 13, 1917.

No Drawing.   Application filed August 27, 1917.   Serial No. 188,470.

*To all whom it may concern:*

Be it known that I, TEÓFANES CARRASCO, a citizen of the United States of Mexico, residing at Atzcapotzalco, Distrito Federal, Mexico, have invented certain new and useful Improvements in Preservatives for Fruits, Eggs, and the like, of which the following is a specification.

My invention relates to a process for the preservation of fruits, eggs, and the like and has for its object the preservation of the commodities referred to for a length of time sufficient to permit of their being transported to great distances, or kept as desired, say for forty to sixty days, or even more, according to the articles treated, and still retain their full and natural flavor and freshness.

To accomplish this purpose I make use of a composition consisting of 1000 grams alcohol 96% strength, in which is dissolved 50 grams gum shellac and 35 grams gum dammar.

The preservative composition is ready for use when the gums have been thoroughly dissolved.

This preservative does not impart any disagreeable odor or flavor to the fruit or other article under treatment, does not contain oils or corrosive elements such as turpentine and the like, is sufficiently elastic to permit of a reasonable amount of handling of the articles treated and in the case of fruits and vegetables they may be eaten freely without removal of the preservative, the flavor being absolutely unchanged.

The articles to be preserved are first cleaned and dried, as to their exterior, then dipped into the preservative which dries very quickly, forming an elastic coating or skin which excludes the air and prevents decay or change.

I am aware of the fact that shellac varnish has heretofore been employed as a preservative for fruits, eggs and the like, but so far as I am aware, such use has been confined to processes in which the articles to be preserved have been subjected to a preparatory step or steps to render them more susceptible to the preservative action of the shellac. I have found, however, that by the use of gum dammar with the shellac, a perfect air excluding composition is provided and the solution being of a very thin nature, produces a much thinner coating on the articles, which dries very quickly, and is not liable to abrasion or to rub off with ordinary handling.

What I claim is:

A preservative composition consisting of 96% strength alcohol, gum shellac, and gum dammar, in the proportions of 1000 grams of alcohol, 50 grams of gum shellac and 35 grams of gum dammar.

In testimony whereof I have affixed my signature in presence of two witnesses.

TEÓFANES CARRASCO.

Witnesses:
 JOSEPH M. BRINGOS,
 ALBERT METRA.